(12) United States Patent
Dormegnie et al.

(10) Patent No.: US 6,691,002 B2
(45) Date of Patent: Feb. 10, 2004

(54) METHOD FOR PREDICTING THE COMFORT PERFORMANCE OF A VEHICLE FITTED WITH A SUSPENSION SYSTEM

(75) Inventors: Eric Dormegnie, Clermont-Ferrand (FR); Pierre Fabry, Clermont-Farrand (FR); Patrice Fraysse, Chamalieres (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 10/042,962

(22) Filed: Jan. 9, 2002

(65) Prior Publication Data

US 2002/0111718 A1 Aug. 15, 2002

Related U.S. Application Data

(63) Continuation of application No. PCT/EP00/06568, filed on Jul. 11, 2000.

(30) Foreign Application Priority Data

Jul. 13, 1999 (FR) .............................................. 99 09218
Feb. 29, 2000 (FR) .............................................. 00 02797

(51) Int. Cl.⁷ ................................................. G06F 7/00
(52) U.S. Cl. ...................................................... 701/1
(58) Field of Search ................................. 701/1, 36, 37

(56) References Cited

U.S. PATENT DOCUMENTS 5,536,059 A * 7/1996 Amirouche ............... 296/65.02

FOREIGN PATENT DOCUMENTS

EP            886130         12/1998

* cited by examiner

*Primary Examiner*—Yonel Beaulieu
(74) *Attorney, Agent, or Firm*—Felipe J. Farley; Christopher Crecente; Alan A. Csontos (57) ABSTRACT

A method for predicting the comfort performance (noise, vibrations) in the cabin of a vehicle fitted with a prototype suspension system when the vehicle is rolling at a given speed on a rolling apparatus made of at least one obstacle, consisting of obtaining an overall transfer function for the vehicle fitted with a reference suspension system, measuring the forces that act at the attachment points of a prototype system, and calculating the noise and vibration outputs by multiplying the overall transfer function by the forces acting at the attachment points of a prototype system.

7 Claims, 7 Drawing Sheets

METHOD FOR PREDICTING THE COMFORT PERFORMANCE OF A VEHICLE FITTED WITH A SUSPENSION SYSTEM

The present application is a continuation of PCT/EP00/06568, titled "Method for Predicting the Comfort Efficiency of a Vehicle Equipped with a System Linking it to the Ground," filed Jul. 11, 2000, listing as inventors Eric Dormegnie, Pierre Fabry, and Patrice Fraysse, published in French under PCT Article 21(2) as WO 01/04589 on Jan. 18 2001, claiming priority to French national applications 99/09218 filed Jul. 13 1999, and 00/02797, filed Feb. 29, 2000.

BACKGROUND OF THE INVENTION

The invention concerns a method for predicting the acoustic and vibratory levels inside a vehicle rolling over ground that has several obstacles or ground of a given particle texture.

The discomfort perceived by the driver and passengers of a vehicle rolling over one or many obstacles (such as manholes, bitumen seams, various joints, gravel, etc.) has two distinct aspects. A first aspect is vibratory and is manifested as vibrations of the vehicle floor, the seats and the steering wheel. A second aspect is acoustic and is manifested as noise produced inside the vehicle by the vibrations of various parts of the vehicle. The discomfort level felt by the occupants of a vehicle depends greatly on the body, the mechanical system through which it is in contact with the ground, the rolling speed and of course the type of obstacle on the road.

Definition of the terms used in what follows:

the "comfort performance" corresponds to the acoustic and/or vibratory level that can be measured inside a vehicle rolling on a road (or a test bed) provided with at least one obstacle of given dimensions;

"suspension system": the group of vehicle elements that provide the link between one or more contact surfaces between the vehicle and the ground and one or more points of the said vehicle; in all cases the suspension system comprises at least one tire and the wheel to which it is fitted;

"body": the group of vehicle elements complementary to the suspension system;

"attachment points": points connecting the suspension system with the body;

"overall transfer finction": a function comprising two parts, a first part concerning the noise in the cabin of the vehicle and a second part concerning the vibrations at certain predetermined points in the said cabin;

"reference suspension system": suspension system fitted to the vehicle and available for obtaining the overall transfer function;

"prototype suspension system": suspension system whose effect on the comfort performance of the same vehicle fitted with the said prototype system in place of the reference system one is seeking to predict, without having the said vehicle available.

For example, a suspension system may consist of a tire and the wheel to which it is fitted: in this case, the point of attachment is the hub. The overall transfer function makes it possible to reproduce the vibration levels inside the body of a vehicle from the forces measured at the hub.

Several methods are known to those familiar with the field for evaluating the comfort performance of a new suspension system for a given vehicle, which make it possible to optimize the said suspension system, such optimization consisting in obtaining characteristics of a contact system that procure an appreciably improved comfort level.

For example, to evaluate and optimize the comfort performance of a vehicle fitted with a new suspension system, a person familiar with the field can use an experimental method involving measurements of the noise and vibrations in the cabin of a vehicle rolling on a section of road or track that produces some vibratory and/or acoustic discomfort in the said vehicle, this section of road or track having one or more obstacles on its surface. However, this method entails availability of the vehicle so that various suspension systems can be evaluated; besides, it can only be carried out in suitable weather conditions and this means that the vehicle is immobilized for times which are sometimes excessively long and consequently lead to excess costs during the development phase of a suspension system since several iterations are often needed. In addition, the method is long and fastidious for the operator and is subject to wide scatter of the measurements.

Furthermore, European Patent Application No. 886130 describes a method of predicting the noise level in the cabin of a vehicle fitted with tires and rolling over uneven ground that has numerous rough points. According to this method, a transfer function is determined for a vehicle fitted with tires by applying, directly to each axle (at the hub) of the vehicle at rest, forces (in the form of shocks) directed in predetermined directions. For each impact a sound recording is made inside the said vehicle and this operation is repeated successively for each of the front and rear positions and on each side of the vehicle. In another stage, an identical tire rolls on a roller track provided on its rolling surface with numerous rough points to simulate uneven ground. In this test, the tire is mounted on a fixed axle and the resultant forces acting at the hub are recorded. Finally, these measured resultant forces are used as input for a model involving the transfer function determined as described earlier so as to obtain the resultant noise level inside the vehicle. This method however, which is certainly interesting, has limitations which, for example with tires of the same size but having different structures, can give noise levels different from those obtained from tests carried out using the same vehicle fitted with these different tires and rolling on uneven ground.

In particular, since the transfer function of the vehicle is established from tests carried out at rest, it is clear that no account is taken of the mechanical characteristics of the tires when rolling, which as a general rule are appreciably different from the same characteristics at rest. Notably, it is known that the vertical rigidity of a tire at rest under dynamic loading is higher than the same vertical rigidity under dynamic loading when the tire is rolling.

Besides, to apply forces at the level of the axles it is necessary to provide an added, fixed component on the outside of the wheel, the said component being designed to receive, for example, blows from a hammer, and it is clear that the mass of the said component is added to the un-sprung weight and so perturbs the measurements made. It must also be pointed out that the noise of each hammer blow, even though means are adopted to attenuate it, is transmitted through the air into the cabin and is at least partly added to the noise one is trying to record inside the vehicle.

The object of the invention is a method of predicting the comfort performance of a vehicle fitted with a suspension system, which does not suffer from the drawbacks of the methods just described.

To achieve this, a method is proposed for predicting the noise and vibrations in the cabin of a vehicle fitted with a prototype suspension system, when the said vehicle is rolling at a given speed V on ground having at least one obstacle of predetermined size.

BRIEF SUMMARY OF THE INVENTION

The method proposed comprises a first stage in which an overall transfer function is determined for the vehicle fitted with a reference suspension system, and a second stage in which forces are measured at the attachment points between the body and the prototype suspension system. Then, the method according to the invention consists in multiplying this overall transfer function of the vehicle obtained in the first stage by the resultant forces acting at the attachment points between the body and the prototype suspension system, when the said prototype suspension system is bearing on its contact surfaces with the ground the same loads as those measured when the vehicle is rolling on the same ground provided with the same obstacle(s).

The overall transfer function is determined by using a series of measurements on the vehicle fitted with a reference suspension system combined with a series of measurements on this reference suspension system attached to a frame at the body attachment points whereby it is fitted to a vehicle. In the case when the suspension system is reduced to the tire and the wheel, the frame is equipped with means that enable the measurement of forces acting at the hub.

The measurements on the vehicle comprise the following stages:
a) the vehicle is fitted with the reference suspension system, the said system being connected to the said vehicle by attachment points;
b) inside the vehicle are arranged means that can record the noise and vibrations at previously predetermined points in the cabin;
c) the vehicle is positioned such that the reference suspension system is in contact via each tire of the said system with rolling means provided on the rolling surface(s) with an obstacle or obstacles;
d) each tire positioned on the said rolling means is rotated at speed V and the noise and vibration signals inside the cabin are recorded.

Then, the resultant forces acting at the said attachment points are obtained for this reference suspension system by carrying out the following steps:
e) the reference suspension system is mechanically fixed to a frame by the same attachment points, the said frame being equipped at these points with means whereby the resultant forces can be determined in three mutually perpendicular directions;
f) the said reference suspension system is applied against the means of rolling used at stage c) provided with the same obstacle(s), such that at its contact surface(s) with the ground the said suspension system supports loads identical to those supported on the vehicle in the position considered;
g) each tire positioned on the rolling means is rotated at speed V and the resultant forces at the attachment points to the frame are recorded.

The combination of the values measured both on the vehicle fitted with the reference suspension system and on the reference suspension system when fitted to a frame, makes it possible to obtain the overall transfer function for the said vehicle rolling on ground provided with an obstacle or obstacles identical to that/those used in the said measurements.

In the case when the suspension system is reduced to the tire and the wheel to which it is fitted, stages e) to g) are carried out again under conditions appropriate for the other axle of the same vehicle, and stages c) and d) are repeated for all the other front and rear positions on the vehicle which have not yet been measured.

It is conceivable to replace the measurements carried out on the reference suspension system (stages e, f, g) by a numerical simulation with the help of a functional model that represents the said system and makes it possible to obtain the forces acting at the body attachment points in a configuration similar to that of rolling over obstacles.

After determining the overall transfer function, the forces acting at the body attachment points of the same vehicle fitted with a prototype suspension system in place of the reference suspension system are measured, reproducing stages e), f) and g) identically with the said prototype suspension system fixed to the same frame and in the same way as the reference suspension system tested previously.

These forces measured at the body attachment points of the prototype suspension system are then multiplied by the overall transfer function of the vehicle to obtain the noise and vibration levels inside the cabin and so to allow characterization of the comfort performance of the vehicle fitted with the prototype suspension system.

As mentioned for the reference suspension system, it is also conceivable to replace the measurements on the prototype suspension system (stages e, f, g) by a numerical simulation with the help of the same functional model, making it possible to obtain the forces that act at the attachment points of the prototype suspension system to the frame in a similar configuration of rolling over obstacles.

The method according to the invention makes it possible to evaluate the comfort performance of a new (prototype) suspension system fitted to a vehicle initially equipped with a known (reference) suspension system. In addition, it is no longer necessary for the vehicle to be available in order to evaluate a new suspension system different from the reference suspension system, once the overall transfer function for the vehicle has been established using the said reference system on a rolling means, provided that the same rolling means is used for the measurement or numerical simulation of the forces acting at the attachment points of the prototype suspension system when fitted to the frame.

To obtain a transfer function still more representative of the behavior of the vehicle at the speed V chosen, it is advantageous to repeat stage d) with the vehicle and stages e), f) and g) with the suspension system alone with at least two different speeds which bracket the speed V. Preferably, two speeds are chosen on either side of the speed V, these being about 10% and 35% higher and lower than V. This makes it possible to take account of non-linearities of the vehicle as a function of the speed value V chosen. The overall transfer function is then obtained by calculating the average of the transfer function established for each speed.

In the case when the suspension system considered is reduced to a tire and the wheel to which it is fitted, it has been found, surprisingly, that for a given vehicle the tire size is immaterial. This means that for a given vehicle designed to be fitted with various tire sizes (for example, tires having different H/S ratios where H is the width of the tire and S the height of its cross-section), an overall transfer function can be determined that applies for all the tire sizes accepted by the said vehicle. To do this, the procedure described above is followed through steps a) to d) for the vehicle fitted with reference tires and steps e) to g) are carried out with the same reference tire, but making all the measurements with at least two other tire inflation pressures. Preferably, the pressures used are between 10% and 20% higher than the utilization pressure of the reference tire and 10% to 20% lower than the utilization pressure of the reference tire. This procedure makes it possible to take account of any variation of rigidity related to the tire's size. The overall transfer function is then obtained by calculating the average of the transfer functions determined for each tire pressure and each speed.

With the method according to the invention, it is easy to predict the comfort performance of as many prototype suspension systems as desired. For each suspension system, the cost of this prediction will amount to the cost of measuring the forces at the body attachment points of the said suspension system, or the cost of numerical simulation of the said forces.

By choosing to proceed in this way, one can appreciate for example all the advantages offered by the method for developing a suspension system for a prototype vehicle, which can only be made available for a short time. Thanks to the method according to the invention, one can even envisage in the long term the possibility of data exchange between a manufacturer of suspension systems and a vehicle manufacturer, without the suspension system manufacturer being able to have access to the vehicle, since the vehicle manufacturer can undertake to test the vehicle and then provide the said vehicle's overall transfer function to the suspension system manufacturer, specifying the conditions under which it was obtained.

Another advantage of the method according to the invention is that the transfer function in effect integrates the noise component resulting from the actual impact of the tire(s) on the obstacle(s) and the impact noise is indeed the real noise.

A further advantage is that it is in effect the real forces acting at the attachment points which are taken into account when determining the overall transfer function and in its subsequent use to evaluate and optimize a new suspension system.

Needless to say, the method according to the invention can be applied to any type of vehicle, notably touring vehicles, vans or heavy-goods vehicles in which comfort performance is important.

The prediction method according to the invention easily allows the size and number of obstacles on the rolling means to be adapted in order to simulate various types of road surface.

Finally, it should be pointed out that the information yielded by the transfer function determined by the method according to the invention makes it possible effectively to improve the comfort performance of a suspension system, since in fact it distinguishes between the transfer of vibrations via the body from the transfer of vibrations via the suspension system.

BRIEF DESCRIPTION OF THE SEVERAL VIEWS OF THE DRAWINGS

The method according to the invention is illustrated by the following figures, which show.

DETAILED DESCRIPTION OF THE INVENTION

Figure 1:
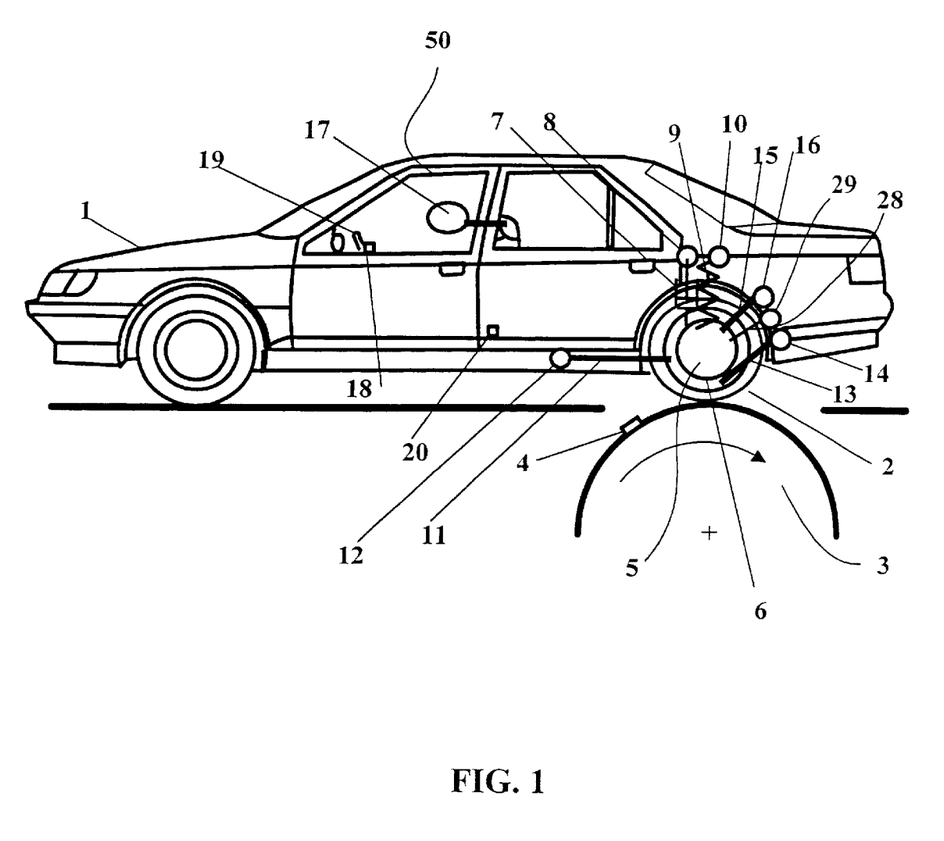
FIG. 1: A touring vehicle whose rear left tire is positioned on a roller track

FIG. 1 shows a touring vehicle 1 whose rear left tire 2 is resting on a roller track 3 of diameter 1.6 m covered by a fine-grained surfacing. A strip 4 of straight rectangular section 20 mm wide and 10 mm high is positioned transversely to the surface of the roller track 3 (i.e. parallel to its rotation axis). Means (not shown) are provided for driving the roller track 3 in rotation.

Figure 2:
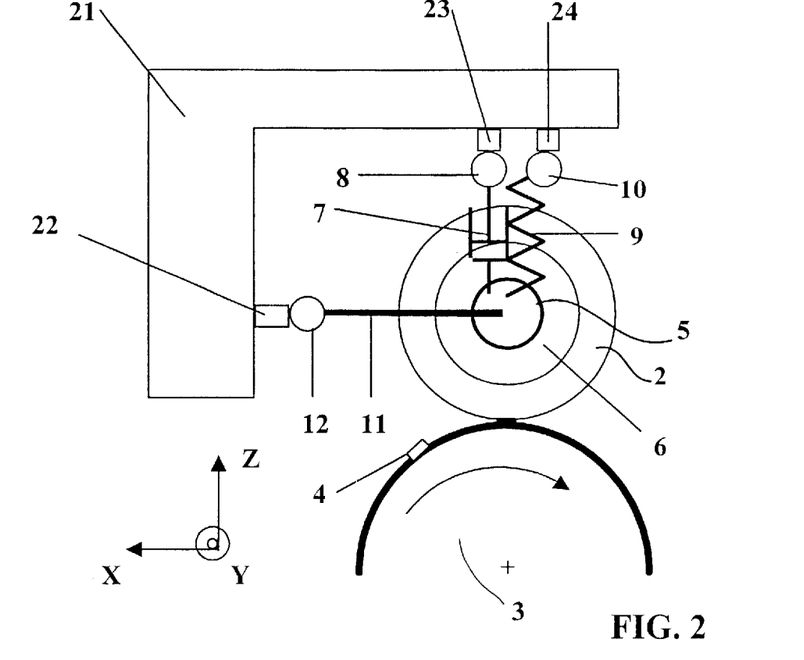
FIG. 2: A suspension system fitted on a frame, the suspension system comprising the tire of FIG. 1 pressed down under the same conditions onto the roller track of FIG. 1
Figure 3:
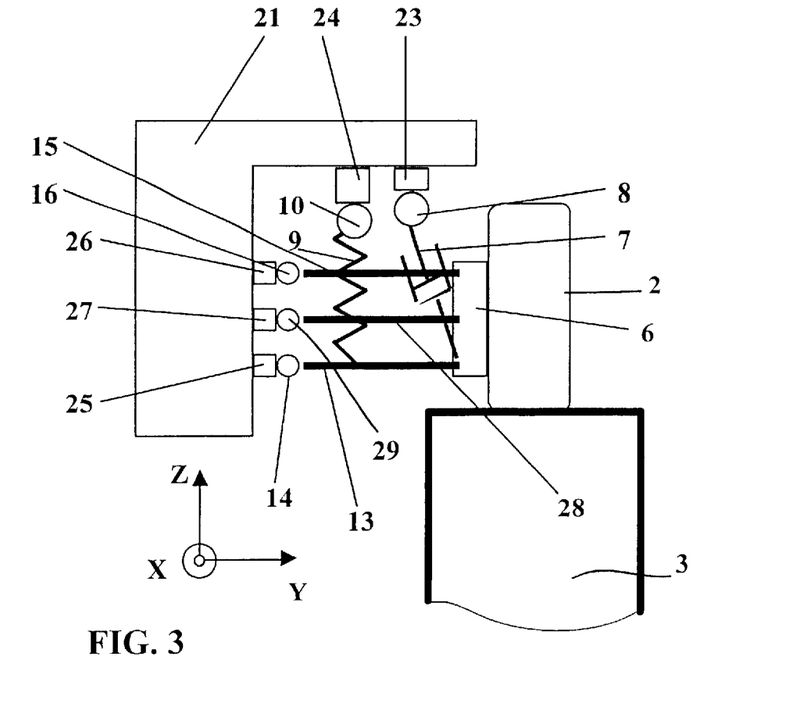
FIG. 3: The assembly of FIG. 2 seen from a different angle

In the first example presented by FIGS. 1, 2 and 3, the suspension system comprises the following elements: a rear left tire 2 fitted on a wheel 5; a hub-support/hub assembly; a rear left brake system 6; a rear left shock absorber 7; an upper attachment 8 of the rear left shock absorber 7; a rear left spring 9; a filtering component 10 of the rear left spring 9; a rear left longitudinal arm 11; an elastic joint 12 connecting the rear left longitudinal arm 11 to the body 50; a rear left lower arm 13; an elastic joint 14 connecting the rear left lower arm 13 to the body 50; a rear left upper arm 15; an elastic joint 16 connecting the rear left upper arm 15 to the body 50; a rear left claw tracking rod 28; a swivel joint connecting the tracking rod 28 to the body 50; various secondary components not shown in the figures (screws, bolts, swivel joint, bearings, elastic joints, etc.)

The vehicle 1 is equipped inside its cabin with:
- a microphone 17 located at the level of the right ear of a driver of the vehicle, to record the noise;
- a three-directional accelerometer 18 positioned on the vehicle's steering wheel 19;
- a three-directional accelerometer 20 positioned on one of the slides of the driver's seat.

For a chosen speed V and under the conditions of rolling on a roller track 3 provided with an obstacle 4, the method according to the invention makes it possible to predict the comfort performance of the vehicle 1 and to analyze the effect on that performance of the suspension system defined above. First, in this position measurements are made of the acoustic pressure and the vibrations at several rotation speeds of the roller track bracketing the reference speed V. For example, speeds equal to ±20% of the speed V are proposed.

The noise and vibration values obtained are the outputs of the system which allow determination of an overall transfer function of the vehicle equipped with its reference suspension system.

To obtain the inputs of the system (these inputs multiplied by the overall transfer function being intended to provide the data previously recorded), the procedure adopted, as illustrated in FIGS. 2 and 3, is to measure the forces at the attachment points to the body of the reference suspension system comprising the elements listed above, the said system being fitted by its attachment points onto a frame 21 with the tire 2 rolling on the same roller track 3 provided with the same obstacle 4.

FIGS. 2 and 3 show the reference suspension system fixed by its attachment points to the frame 21 and supporting, on its contact surface between the tire 2 and the roller track, the load supported by the said reference system when it is fitted on the vehicle 1 as shown in FIG. 1.

The plane of FIG. 2 contains the directions designated X and Z (direction Y is perpendicular to the plane of FIG. 2 and parallel to the direction of the rotation axis of the roller track 3). The plane of FIG. 3 contains the perpendicular directions Y and Z.

The frame 21 is designed such that its first resonance frequency does not lie within the range of frequencies within which the measurements are made.

At each of the six attachment points of the reference suspension system to the frame 21 are positioned force sensors 22, 23, 24, 25, 26, 27 to record the forces acting in three perpendicular directions at those points.

The measurements on the reference system alone are effected at the same speed values as those used for the measurements on the vehicle 1 fitted with the reference suspension system.

By then using the values determined on the vehicle fitted with the reference suspension system and those determined on the reference system alone, one calculates for each speed bracketing the speed V an overall transfer function which characterizes the vehicle is calculated, comprising a first transfer function from which the acoustic pressure in the cabin can be determined taking account of the forces at the body attachment points, and a second transfer function from which the vibration levels at the steering wheel and at floor level in the vehicle can be obtained taking account of the same forces at the body attachment points.

Finally, the overall transfer function of the vehicle at speed V is established by averaging the various overall transfer functions obtained for each speed.

Having then obtained the overall transfer function of a vehicle fitted with the reference suspension system, it is easy to predict for the same vehicle the level of the comfort performance level produced by a prototype system different from the reference system. To do this, it suffices to repeat the operations described earlier for the reference system mounted on the measurement frame 21 as shown in FIG. 2, to determine, for example by measurement, the forces that act at the attachment points to the frame on which is mounted the prototype system whose performance level on the vehicle is to be characterized. These forces are treated in the same way as the forces obtained with the reference system and are then multiplied by the previously determined overall transfer function of the vehicle.

Using the method according to the invention it is easy to modify one or other of the elements forming the suspension system of a vehicle and to predict the effect of this change on the comfort performance of the said vehicle.

A first example of the application of the method according to the invention concerns a reference suspension system as shown in FIGS. 2 and 3, which comprises inter alia a tire of size 195/65 R 15 XH 1 fitted to a reference vehicle.

Firstly, acoustic pressure and vibration measurements are made at several speeds (in this case: 40, 50, 70 and 80 km/h) bracketing the reference speed V equal to 60 km/h. Each measurement is the average result of twenty rotations of the roller track, recording being made by spatial sampling of 4096 points per rotation of the track.

Then, by means of a Fast Fourrier Transform (FFT) the frequency range is adjusted before re-sampling in order to be homogeneous for all the speeds.

The noise and vibration values obtained are the outputs of the system, from which an overall transfer function can be determined for the vehicle fitted with its reference suspension system.

To obtain the inputs of the system (these inputs multiplied by the overall transfer function being intended to provide the outputs previously recorded), measurements are made of the forces at the attachment points of the same reference suspension system rolling on the same roller track provided with the same surface and the same obstacle.

All the measurements are made for a pressure of 2.1 bar and a supported load of 275 daN corresponding to the conditions on the reference vehicle.

The measurements are made at the same speeds (40, 50, 70 and 80 km/h) bracketing the reference speed V (60 km/h). Each measurement is the average result of twenty roller track rotations. Recording is effected by the spatial sampling of 4096 points per rotation of the track.

Finally, Fourrier transformation (FFT) is used to adjust the frequency range before re-sampling in order to be homogeneous for all the speeds chosen.

All the measurements carried out with the vehicle and on the reference suspension system alone are repeated for two other tire pressures (1.8 and 2.4 bar) which bracket the utilization pressure of 2.1 bar.

Using the values determined on the vehicle fitted with the reference suspension system and those determined on the reference suspension system alone, for each speed an overall transfer function is calculated which characterizes the vehicle, comprising a first transfer function from which the acoustic pressure in the cabin can be determined taking account of the forces at the body attachment points, and a second transfer function from which the vibration levels at the steering wheel and at floor level in the vehicle can be obtained taking the same forces at the attachment points into account. Finally, an overall transfer function of the vehicle at speed V is established by averaging the various overall transfer functions obtained for each speed and each tire pressure.

Having obtained the overall transfer function of a vehicle fitted with a reference suspension system, it is then possible to predict, for the same vehicle, the comfort performance level of a prototype suspension system different from the reference suspension system. To do this, the measurements at the attachment points of the prototype system are repeated under the same conditions as those used for the reference system.

Figure 5:
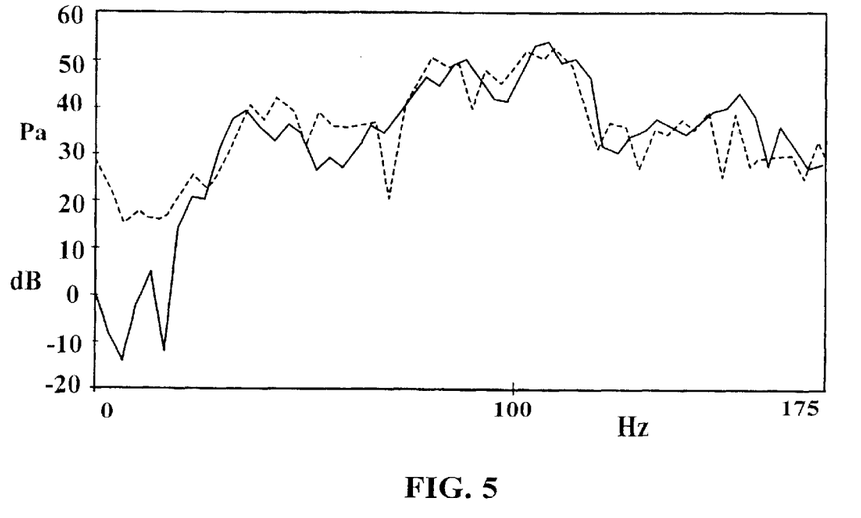
FIG. 5: Comparison of the noise inside the cabin of a touring vehicle when passing over a bump, and the noise predicted by the method according to the invention, for a prototype suspension system
Figure 6:
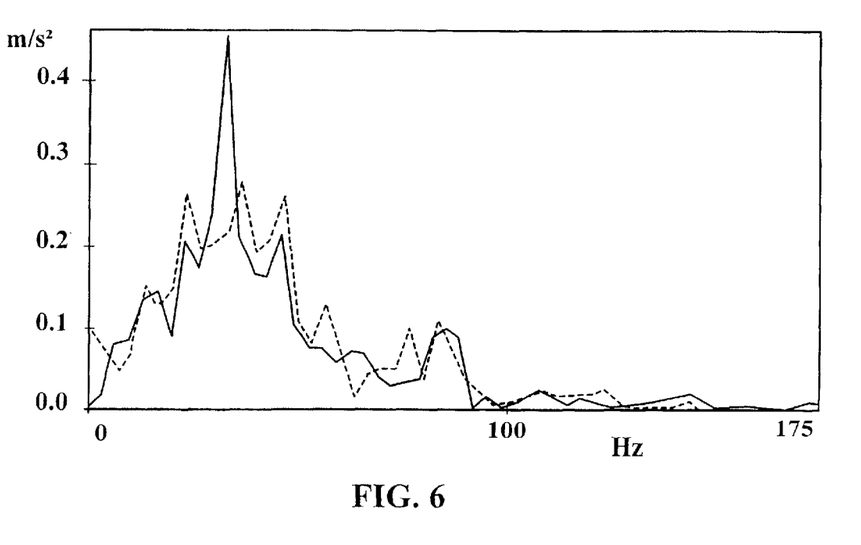
FIG. 6: Comparison of the vibrations recorded in a direction tangential to the steering wheel of the vehicle when passing over a hump, and the vibrations obtained by the method according to the invention, for the prototype suspension system of FIG. 5
Figure 7:
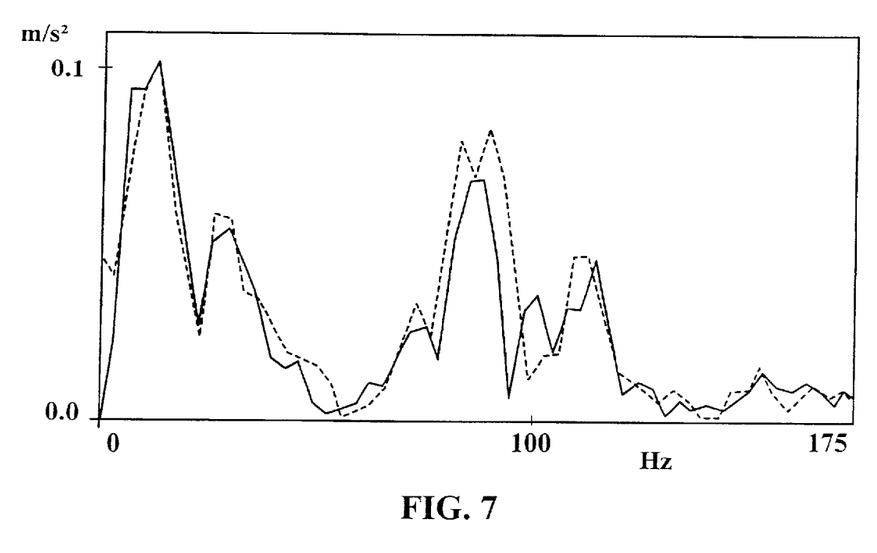
FIG. 7: Repetition of the vibration comparison at the level of the cabin floor, with the accelerations in the vertical direction

The example shown in FIGS. 5 to 7 corresponds to a prototype suspension system differing from the reference suspension system only in the size of the tire used (205/60 R 15 M+S 330) and the corresponding wheel to which it is fitted.

FIG. 5 shows a comparison of the acoustic pressure recorded (broken line) inside the cabin of the touring vehicle fitted with a prototype suspension system when passing over a bump, with the noise (full line) predicted by the method according to the invention at the same speed V (60 km/h). The frequencies from 0 to 175 Hz are plotted on the abscissa, while the ordinate is graduated in decibels (from 0 to 60 dBA).

FIGS. 6 and 7 compare the values determined in the vehicle with those predicted by the model according to the invention, for the vibrations induced at the level of the steering wheel and at floor level during rolling on a track comprising a bump. FIG. 6 shows (full line) the accelerations in a direction tangential to the vehicle's steering wheel predicted by the model according to the invention, and (broken line) the same accelerations obtained experimentally. FIG. 7 shows (full line) the accelerations in the vertical direction predicted by the model according to the invention at floor level in the vehicle, and (broken lines) the same accelerations obtained experimentally.

In a second example of the application of the method according to the invention, the suspension system studied comprises only a tire 2' of size 205/65 R 15 MXT and the corresponding wheel 5' to which it is fitted.

Firstly, the measurements of acoustic pressure and vibrations are made at several speeds (in this case 40, 50, 70 and 80 km/h) which bracket the reference speed V equal to 60 km/h. Each measurement is the averaged result of twenty roller track rotations, and recording is effected by spatial sampling of 1024 points per rotation of the track.

Then, Fourrier transformation (FFT) is used to adjust the frequency range before re-sampling in order to be homogeneous for all the speeds.

After these measurements, carried out on the left-hand side of the rear axle, the same type of measurements are repeated on the right-hand side of the rear axle and then on both sides of the front axle.

The noise and vibration values obtained are the outputs of the system from which an overall transfer function can be determined for the vehicle fitted with these reference tires.

Figure 4:
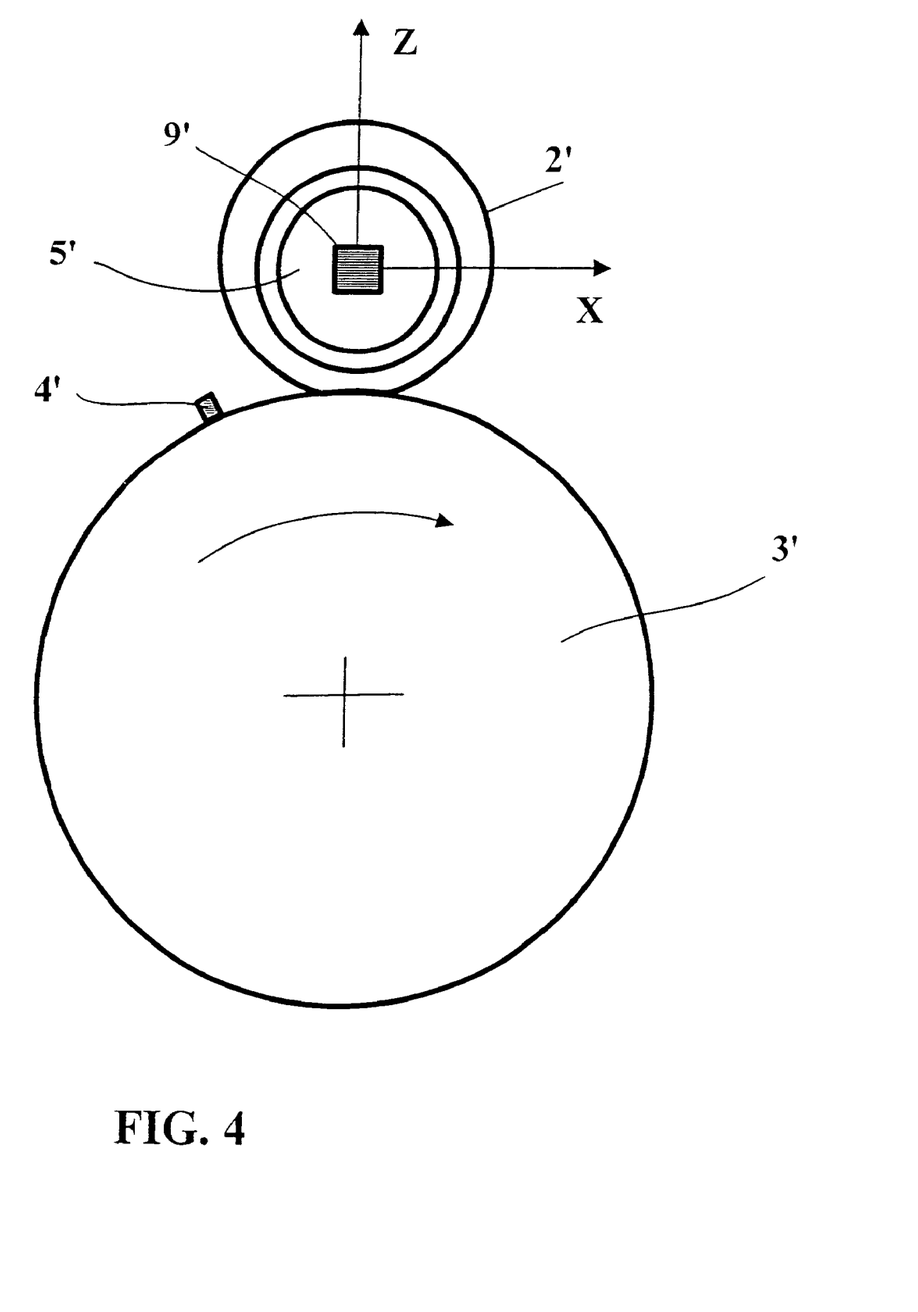
FIG. 4: A tire fitted to its wheel and pressed against a roller track in order to implement the stages of the process according to the invention

To obtain the inputs of the system (these inputs multiplied by the overall transfer function being intended to provide the outputs previously recorded), measurements are made of the forces acting at the hub of a reference tire of the same type fitted on the same wheel and rolling on the same roller track provided with the same surface and the same obstacle. FIG. 4 shows a reference tire 2' fitted on its wheel 5' and inflated to its utilization pressure (2 bar), corresponding to its utilization conditions as the rear left wheel of a vehicle, the said tire 2' being pressed against a roller track 3' provided with an obstacle 4' on its rolling surface. The load applied to the tire, namely 284 daN, again corresponds to the actual load supported by the tire when fitted at the rear left of the vehicle, so that the rolling conditions chosen are realistic. The fitting wheel 5' is held on a dynamometric hub 9' that enables recording of the forces that act at the center of the said wheel in three perpendicular directions, two of which, designated X and Z, are in the plane of the figure while the third is parallel to the rotation axis of the track on which the tire is rolling.

The measurements are carried out using the dynamometric hub 9' at the same speeds (40, 50, 70 and 80 km/h) bracketing the reference speed V (60 km/h). Each measurement is the averaged result of twenty track rotations, and recording is effected by spatial sampling of 1024 points per rotation of the track.

The same measurements are then repeated with the same reference tire using the utilization conditions (pressure equal to 2 bar, load equal to 483 daN) that correspond to those of the tires on the front axle of the same vehicle. Finally, by Fourrier transformation (FFT) the frequency range is adjusted before re-sampling in order to be homogeneous for all the speeds chosen.

All the measurements carried out with the vehicle and on the reference tire alone are repeated for two other pressures (1.7 and 2.3 bar) which bracket the utilization pressure of 2 bar.

Using the values determined on the vehicle fitted with reference tires and those determined from the reference tire alone, for each speed an overall transfer function is calculated which characterizes the vehicle, comprising a first transfer function from which, taking account of the forces at the hub, the acoustic pressure in the cabin can be determined and a second transfer function from which, taking account of the same hub forces, the vibration levels at the vehicle's steering wheel and at floor level can be obtained. Finally, an overall transfer function for the vehicle at speed V is established by averaging the various overall transfer functions obtained for each speed and each inflation pressure.

Having obtained the overall transfer function of a vehicle fitted with reference tires of size 205/65 R 15 MXT, it is easy to predict, for the same vehicle, the level of comfort performance given by a test tire different from the reference tire. To do this, it suffices to repeat the operations described using the support of FIG. 4 in order to determine the hub forces on the wheel to which the test tire is fitted, whose performance level on the vehicle is to be characterized. These forces are treated in the same way as those obtained using the reference tire, and are then multiplied by the previously determined overall transfer function of the vehicle.

Figure 8:
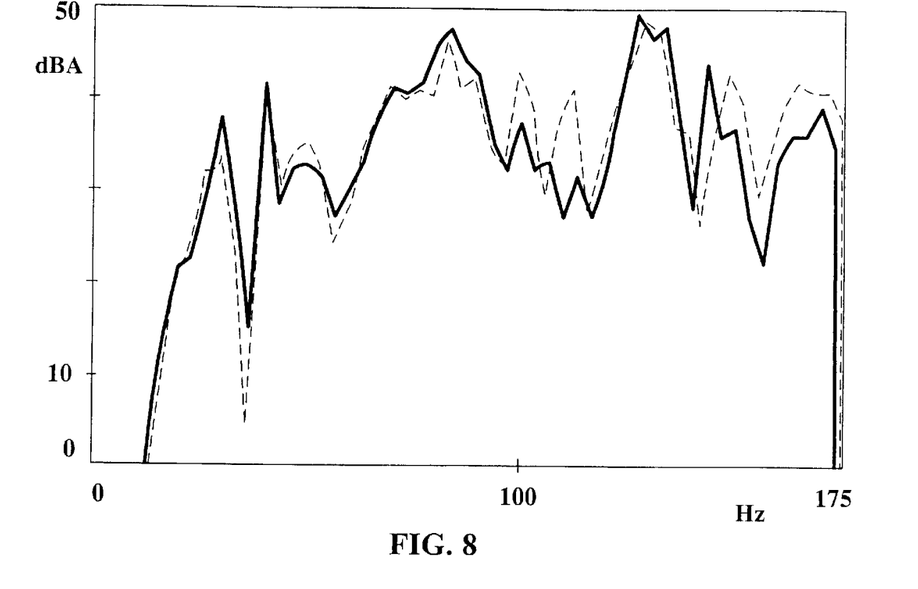
FIG. 8: Comparison of the noise recorded inside the cabin of a touring vehicle when passing over a bump, and the noise predicted by the method according to the invention, in the case when the suspension system is reduced to a tire and the wheel to which it is fitted

FIG. 8 shows a comparison of the acoustic pressure recorded (broken line) inside the cabin of a touring vehicle fitted with a test tire of size 205/60 R 15 M+S 330 when passing over a bump, and the noise (full line) predicted by the method according to the invention at the same speed V equal to 60 km/h. The frequencies from 0 to 175 Hz are plotted on the abscissa while the ordinate is graduated in decibels (from 0 to 50 dBA).

Figure 9:
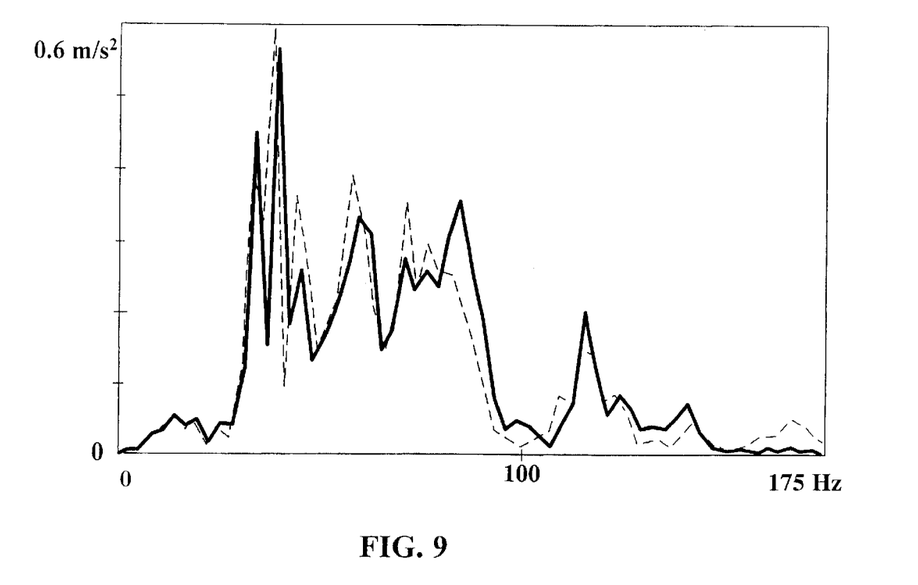
FIG. 9: Comparison of the vibrations recorded in a direction tangential to the vehicle's steering wheel when passing over a bump, and the vibrations obtained by the method according to the invention, in the case when the suspension system is reduced to a tire and the wheel to which it is fitted.
Figure 10:
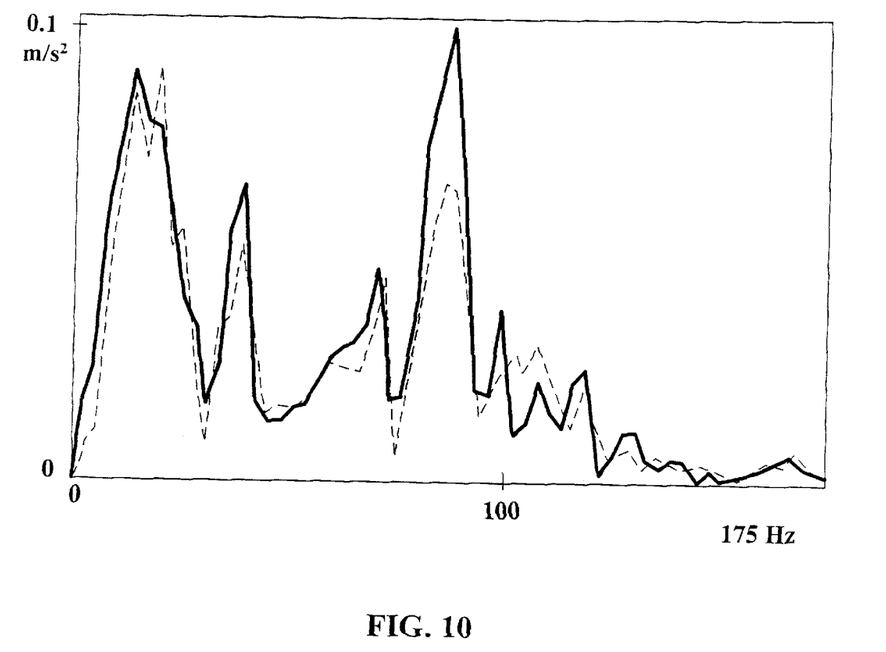
FIG. 10: Repetition of the comparison of FIG. 8 at the level of the cabin floor, with the accelerations in the vertical direction

FIGS. 9 and 10 compare the values measured on a vehicle and those predicted by the model according to the invention, in this case of the vibrations induced at the steering wheel and at floor level during rolling on a track provided with a bump. FIG. 9 shows (full line) the accelerations in a direction tangential to the steering wheel predicted by the model according to the invention, and (broken line) the same accelerations obtained experimentally. FIG. 10 shows (full line) the vertical accelerations predicted by the model according to the invention at floor level in the vehicle, and (broken lines) the same accelerations obtained experimentally.

The results obtained with the two examples presented demonstrate with sufficient clarity that the method according to the invention provides very good predictions of the comfort performance level given by a new suspension system or a new tire fitted on a vehicle wen the said vehicle is not permanently available for repeating the measurements with new test tires.

Needless to say, what has been described in relation to rolling means of the roller track type can equally well be done using a rolling machine that reproduces rolling conditions approximating flat ground (notably a "flat strip" machine).

We claim:
1. A method for predicting the comfort performance in the cabin of a vehicle fitted with a prototype suspension system comprising a tire and a wheel, which suspension system has body attachment points, when said vehicle is rolling at a given speed V on rolling means comprising on the surface at least one obstacle of predetermined size, said determination method consisting:

firstly, in obtaining an overall transfer function for the vehicle fitted with a reference suspension system having body attachment points by measuring factors selected from the group consisting of the noise and vibration levels inside the vehicle when it is rolling at speed V on the rolling means provided with the obstacle and determining by means selected from the group consisting of measuring and calculating with the aid of a functional numerical model the forces that act at the attachment points to the body of the same reference suspension system while rolling at the same speed V on the same rolling means provided with the obstacle;

secondly, determining by means selected from the group consisting of measuring and calculating with the aid of a functional numerical model the forces that act at the body attachment points of the prototype suspension system under the same rolling conditions as those previously used for the reference suspension system;

and lastly, calculating the outputs selected from the group consisting of noise and vibrations in the vehicle by multiplying the vehicle's overall transfer function by the forces acting at the body attachment points of the prototype suspension system.

2. A method according to claim 1, wherein to determine the overall transfer function, measurements are made on the vehicle in accordance with the following stages:

a) the vehicle is fitted with the reference suspension system;

b) means are positioned inside the vehicle that can record the noise and vibrations at predetermined points in the cabin;

c) said reference suspension system is then placed on rolling means provided on the rolling surface with an obstacle;

d) each tire placed on the rolling means is caused to rotate at speed V and the noise and vibration signals inside the cabin are recorded;

e) at its body attachment points, the reference suspension system is fixed to a frame equipped at said attachment points with means for measuring the forces acting in three perpendicular directions;

f) said reference suspension system is pressed against the rolling means of stage c) provided with the same obstacle, such that said suspension system supports on its contact surface with the ground loads identical to the loads supported on the vehicle in the position considered;

g) each tire placed on the rolling means is caused to rotate at speed V, and the forces acting at the attachment points of the reference suspension system to the frame are recorded.

3. A method according to claim 2, wherein the overall transfer function is obtained by repeating the measurements described in stages a) to g) for at least two other speeds which bracket the speed V and averaging the transfer functions obtained for all these speeds.

4. A method according to claim 3, wherein the additional speeds chosen are between 10% and 35% lower and higher than the speed V.

5. A method according to claim 2, further comprising wherein the suspension system is limited to the tire and the wheel to which it is fitted, and further comprising where the vehicle has at least two front and rear positions, and stages c) and d) are repeated for all the other front and rear positions on the vehicle, and further comprising wherein the frame is equipped with a hub which enables forces acting at the center of the wheel to be determined.

6. A method according to claim 5, wherein the suspension system analyzed comprises a tire and the wheel to which it is fitted, and further comprising wherein the tire has a utilization pressure, and the measurement stages a) to d) with the vehicle fitted with reference tires and e) to g) for the tire alone, reference and test, are carried out with at least two additional inflation pressure values, the said values bracketing the utilization pressure.

7. A method according to claim 6, wherein the additional pressures are between 10% and 20% higher than the utilization pressure of the reference tire and 10% to 20% lower than the utilization pressure of the reference tire.

* * * * *